United States Patent
Ishibashi et al.

(10) Patent No.: US 11,117,515 B2
(45) Date of Patent: Sep. 14, 2021

(54) MONITORING SYSTEM

(71) Applicant: Yazaki Corporation, Tokyo (JP)

(72) Inventors: Shuichi Ishibashi, Shizuoka (JP); Jun Goto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/974,123

(22) Filed: May 8, 2018

(65) Prior Publication Data

US 2018/0334097 A1 Nov. 22, 2018

(30) Foreign Application Priority Data

May 19, 2017 (JP) .............................. JP2017-099577
Jul. 12, 2017 (JP) ................................ 2017-136217

(51) Int. Cl.
  *B60Q 9/00* (2006.01)
  *B60N 2/00* (2006.01)
  *B60N 2/90* (2018.01)

(52) U.S. Cl.
  CPC ............... *B60Q 9/00* (2013.01); *B60N 2/002* (2013.01); *B60N 2002/981* (2018.02)

(58) Field of Classification Search
  None
  See application file for complete search history.

(56) References Cited

U.S. PATENT DOCUMENTS

| | | | | | |
|---|---|---|---|---|---|
| 2,859,382 | A | * | 11/1958 | Ellithorpe | B60Q 11/002 315/83 |
| 5,689,241 | A | * | 11/1997 | Clarke, Sr. | A61B 5/18 340/575 |
| 6,049,747 | A | * | 4/2000 | Nakajima | B60N 2/002 340/576 |
| 6,186,538 | B1 | * | 2/2001 | Hamada | B60N 2/002 280/728.2 |
| 6,575,902 | B1 | * | 6/2003 | Burton | B60T 7/12 600/300 |
| 6,744,370 | B1 | * | 6/2004 | Sleichter, III | B60N 2/56 340/576 |
| 8,339,285 | B2 | * | 12/2012 | Boren | B60N 2/976 340/965 |

(Continued)

FOREIGN PATENT DOCUMENTS

| JP | 2009-48605 A | 3/2009 |
|---|---|---|
| JP | 2009-277145 A | 11/2009 |

(Continued)

*Primary Examiner* — Muhammad Adnan
(74) *Attorney, Agent, or Firm* — Sughrue Mion, PLLC (57) ABSTRACT

A monitoring system includes: a monitoring device that outputs a warning when detecting abnormality of a monitoring target person in an interior of a vehicle; a housing arranged on a surface on the interior side of a roof of the vehicle; and a release operation unit arranged being exposed to an outer face of the housing, the release operation unit being able to receive an input of a warning release operation. The monitoring device, in a state of outputting the warning, releases the warning when the warning release operation is input to the release operation unit. As a result, the monitoring system can appropriately monitor the monitoring target person in the interior of the vehicle.

10 Claims, 7 Drawing Sheets

(56) References Cited

U.S. PATENT DOCUMENTS

| | | | |
|---|---|---|---|
| 8,725,311 B1* | 5/2014 | Breed | A61B 5/0507 701/1 |
| 9,079,526 B2* | 7/2015 | Ishikawa | G02B 27/01 |
| 9,626,866 B2* | 4/2017 | Waite | G08G 1/09623 |
| 9,773,179 B2* | 9/2017 | Vicente | G06K 9/0061 |
| 9,818,283 B2* | 11/2017 | Akiva | B60W 40/08 |
| 10,231,614 B2* | 3/2019 | Krueger | A61B 5/163 |
| 10,349,032 B2* | 7/2019 | Jemander | G06T 7/70 |
| 10,528,802 B2* | 1/2020 | Yang | G06K 9/00845 |
| 10,750,164 B2* | 8/2020 | Seo | H04N 13/31 |
| 10,936,888 B2* | 3/2021 | Banno | G06K 9/00281 |
| 2005/0169003 A1* | 8/2005 | Lindahl | B60R 1/12 362/494 |
| 2006/0214807 A1* | 9/2006 | Tengshe | G08B 21/06 340/576 |
| 2008/0080741 A1* | 4/2008 | Yokoo | B60R 21/01538 382/104 |
| 2008/0291032 A1* | 11/2008 | Prokhorov | G08B 21/06 340/576 |
| 2008/0319602 A1 | 12/2008 | McClellan et al. | |
| 2010/0253526 A1* | 10/2010 | Szczerba | G08B 21/06 340/576 |
| 2011/0295466 A1* | 12/2011 | Ostu | B60N 2/002 701/45 |
| 2012/0154156 A1* | 6/2012 | Kuntzel | G08B 21/06 340/575 |
| 2012/0283894 A1* | 11/2012 | Naboulsi | A61B 5/18 701/1 |
| 2013/0012802 A1* | 1/2013 | Horseman | A61B 5/369 600/383 |
| 2013/0018549 A1* | 1/2013 | Kobana | B60K 28/06 701/41 |
| 2013/0070043 A1* | 3/2013 | Geva | B60K 28/066 348/14.02 |
| 2013/0226408 A1* | 8/2013 | Fung | B62D 6/007 701/41 |
| 2014/0276112 A1* | 9/2014 | Fung | A61B 8/02 600/479 |
| 2014/0306826 A1* | 10/2014 | Ricci | G01C 21/3697 340/573.1 |
| 2014/0310788 A1* | 10/2014 | Ricci | G06F 21/31 726/6 |
| 2015/0092994 A1* | 4/2015 | Masuda | B60R 25/25 382/107 |
| 2016/0272217 A1* | 9/2016 | Kim | G06K 9/00255 |
| 2017/0210357 A1* | 7/2017 | Nagai | B60T 7/14 |
| 2017/0305440 A1* | 10/2017 | Oba | B60W 50/082 |
| 2018/0257563 A1* | 9/2018 | Kodama | B60Q 9/008 |
| 2018/0345903 A1* | 12/2018 | Ishibashi | B60R 22/48 |

FOREIGN PATENT DOCUMENTS

| | | |
|---|---|---|
| JP | 2009277145 A * | 11/2009 |
| JP | 2010-204847 A | 9/2010 |
| JP | 2010-531515 A | 9/2010 |
| JP | 2016-38793 A | 3/2016 |
| JP | 2016-115023 A | 6/2016 |

* cited by examiner

MONITORING SYSTEM

CROSS-REFERENCE TO RELATED APPLICATION(S)

The present application claims priority to and incorporates by reference the entire contents of Japanese Patent Application No. 2017-099577 filed in Japan on May 19, 2017 and Japanese Patent Application No. 2017-136217 filed in Japan on Jul. 12, 2017.

BACKGROUND OF THE INVENTION

1. Field of the Invention

The present invention relates to a monitoring system.

2. Description of the Related Art

As a conventional monitoring system mounted on a vehicle, for example, Japanese Patent Application Laid-open No. 2016-038793 discloses a driver monitoring device including a detection module, a determination module, a notification module, and a vehicle stop module. The detection module detects unbalanced posture of a driver based on an image of a driver's seat of the vehicle photographed by a camera. The determination module determines whether the unbalanced posture of the driver detected by the detection module is unbalanced posture due to a habit of the driver. The notification module makes a notification about the unbalanced posture to the driver in different modes between a case in which the determination module determines that the unbalanced posture is caused by a habit and a case in which the determination module determines that the unbalanced posture is caused by a factor other than the habit. In a case in which the posture of the driver is not improved after the notification module attracts attention and a predetermined condition is satisfied, the vehicle stop module outputs a signal for safely stopping the vehicle to a vehicle control device.

The driver monitoring device disclosed in Japanese Patent Application Laid-open No. 2016-038793 described above may cause inconvenience due to useless vehicle stop, for example. There is room for improvement in the driver monitoring device to implement more appropriate monitoring based on the above problem.

SUMMARY OF THE INVENTION

The present invention is made in view of such a situation, and provides a monitoring system that can appropriately monitor a monitoring target person in an interior of a vehicle.

In order to solve the above mentioned problem and achieve the object, a monitoring system according to one aspect of the present invention includes a monitoring device that outputs a warning when detecting abnormality of a monitoring target person in an interior of a vehicle; a housing arranged on a surface on the interior side of a roof of the vehicle; and a release operation unit arranged being exposed to an outer face of the housing, the release operation unit being able to receive an input of a warning release operation, wherein the monitoring device, in a state of outputting the warning, releases the warning when the warning release operation is input to the release operation unit.

According to another aspect of the present invention, in the monitoring system, it is preferable that the monitoring device is arranged in the housing.

According to still another aspect of the present invention, in the monitoring system, it is preferable that the monitoring device outputs the warning based on a position of the monitoring target person with respect to a state determination region that is three-dimensionally virtualized in the interior of the vehicle.

According to still another aspect of the present invention, in the monitoring system, it is preferable that further comprising: an illumination unit that illuminates the release operation unit.

According to still another aspect of the present invention, in the monitoring system, it is preferable that a plurality of pairs of the release operation unit and the illumination unit that illuminates the release operation unit are arranged, an operation of any one of the pairs is validated and operations of the other pairs are invalidated when the warning is output by the monitoring device, the illumination unit the operation of which is validated illuminates the release operation unit, the illumination unit the operation of which is invalidated does not illuminate the release operation unit, and the monitoring device, in a state of outputting the warning, releases the warning when the warning release operation is input to the release operation unit the operation of which is validated, and does not release the warning when the warning release operation is input to the release operation unit the operation of which is invalidated.

According to still another aspect of the present invention, in the monitoring system, it is preferable that the illumination unit causes an illumination mode for the release operation unit to be variable based on a detection result of the state of the monitoring target person obtained by the monitoring device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments according to the present invention in detail with reference to the drawings. The present invention is not limited to the embodiments. Components described in the following embodiments include a component that is replaceable and easily conceivable by those skilled in the art, or substantially the same component.

First Embodiment

Figure 1:
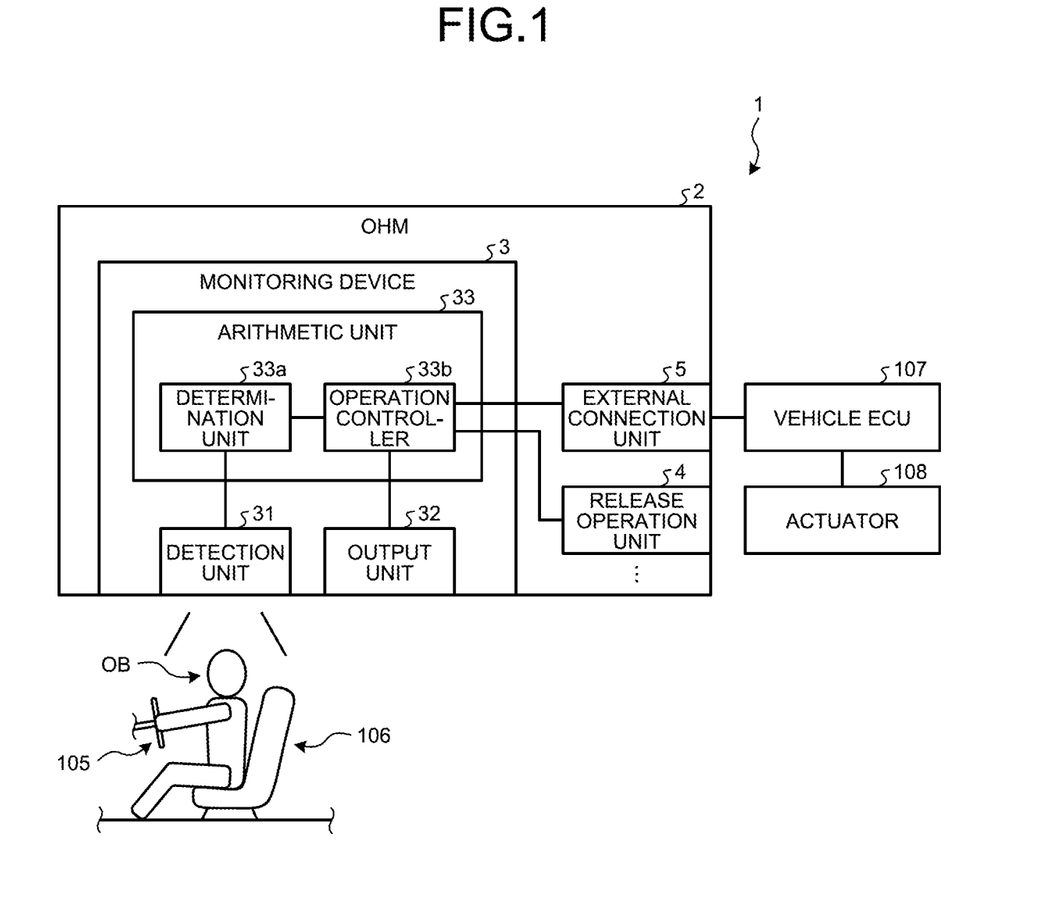
FIG. 1 is a block diagram illustrating a schematic configuration of a monitoring system according to a first embodiment.
Figure 2:
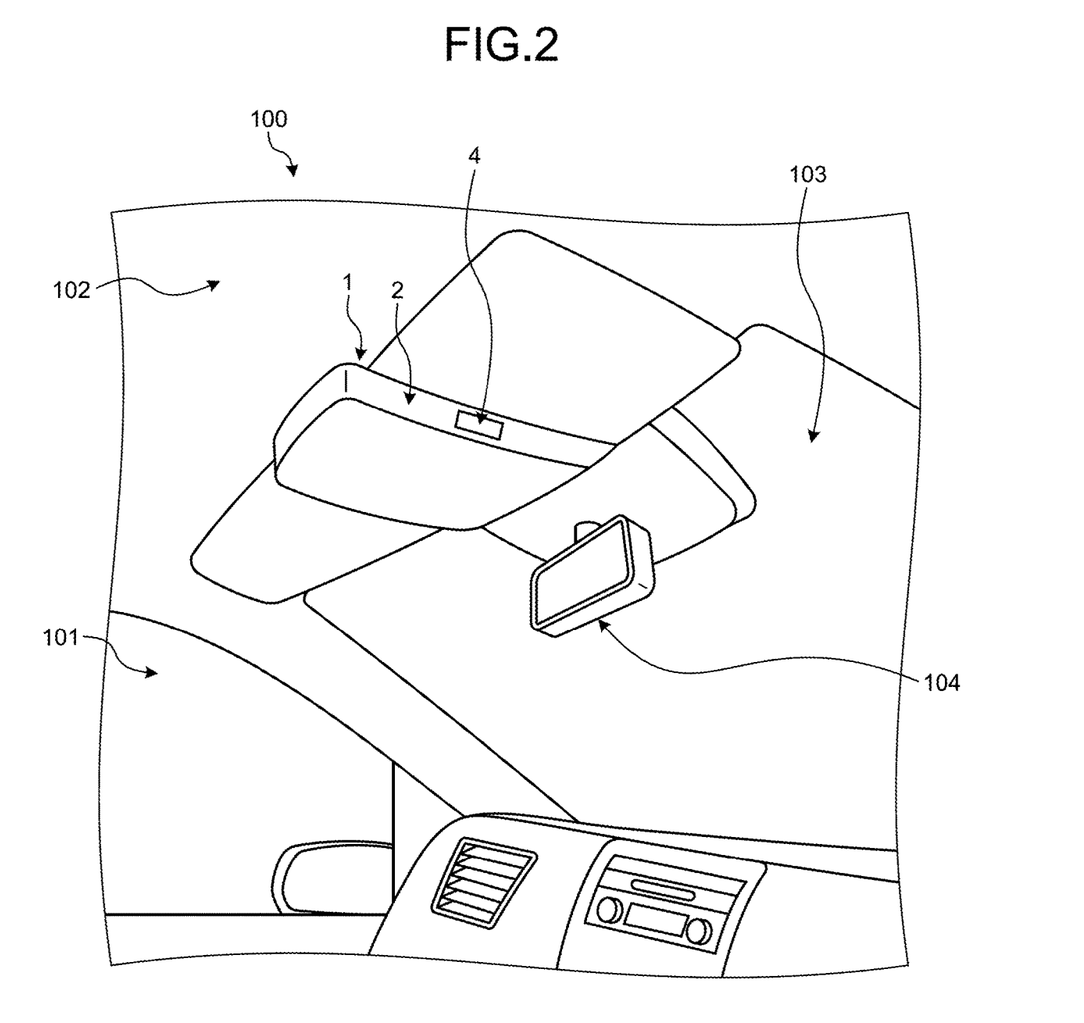
FIG. 2 is a partial schematic diagram illustrating a schematic configuration of an interior of a vehicle to which the monitoring system according to the first embodiment is applied.

A monitoring system 1 according to a first embodiment illustrated in FIGS. 1 and 2 is an onboard system (driver abnormality handling system) that is mounted on a vehicle 100, monitors a monitoring target person OB in an interior 101 of the vehicle 100, and performs various pieces of processing when the monitoring target person OB is in an abnormal state. The monitoring target person OB is a person to be monitored by the monitoring system 1. The monitoring target person OB is a passenger getting in the interior 101 of the vehicle 100, in this case, a driver of the vehicle 100. The monitoring system 1 according to the present embodiment is arranged on a surface on the interior 101 side of a roof 102 of the vehicle 100 as a whole, and constitutes an over-head module (OHM) integrating various functions. The following describes a configuration of the monitoring system 1 in detail with reference to the drawings.

Specifically, as illustrated in FIGS. 1 and 2, the monitoring system 1 includes a housing 2, a monitoring device 3, a release operation unit 4, and an external connection unit 5. The monitoring system 1 constituting the over-head module may further include, for example, a map lamp, a wireless communication unit, an antenna, various operation units, and a power supply distribution unit.

The housing 2 houses components constituting the monitoring system 1. A plurality of members are combined to form the housing 2 in a hollow box shape as a whole. The housing 2 is made of a synthetic resin having an insulation property. The housing 2 houses the monitoring device 3, the release operation unit 4, and the external connection unit 5 to be unitized as an over-head module. Part of the monitoring device 3, the release operation unit 4, and the external connection unit 5 housed inside the housing 2 is exposed to an outer face. The housing 2 according to the present embodiment is arranged on the surface on the interior 101 side of the roof 102 of the vehicle 100. The roof 102 is a structure that is coupled to a vehicle main body via a pillar and the like, and is supported on an upper side in a vertical direction of the vehicle main body. A region of the vehicle 100 is divided into the interior 101 and an outside using the roof 102 as a boundary on the upper side in the vertical direction. The housing 2 is arranged at a crossing portion of the roof 102 and a windshield 103, and at a substantially center position in a vehicle width direction of the vehicle 100. The windshield 103 is arranged at a front part of the vehicle 100 as a boundary between the interior 101 and the outside, and is also called a windscreen. In the vehicle 100, a room mirror 104 is arranged at a crossing portion of the windshield 103 and the roof 102, and the housing 2 is arranged in the vicinity of the room mirror 104. Typically, the housing 2 is arranged at a position where a driver can reach, the driver sitting on a driver's seat 106 (also refer to FIG. 3) facing a steering 105 (also refer to FIG. 3) as a steering member for steering the vehicle 100.

The monitoring device 3 monitors a state of the monitoring target person OB in the interior 101 of the vehicle 100. The monitoring device 3 outputs a warning when detecting abnormality of the monitoring target person OB. As described above, the monitoring device 3 according to the present embodiment is arranged in the housing 2, and constitutes part of the over-head module. The monitoring device 3 according to the present embodiment monitors the state of the driver sitting on the driver's seat 106 as the monitoring target person OB in the interior 101 of the vehicle 100 as an example. Specifically, the monitoring device 3 includes a detection unit 31, an output unit 32, and an arithmetic unit 33.

The detection unit 31 detects the state of the monitoring target person OB. The detection unit 31 according to the present embodiment is constituted of a detector such as a stereo camera that can measure a three-dimensional position of the driver sitting on the driver's seat 106 as the state of the monitoring target person OB. The detection unit 31 is, for example, arranged in the housing 2 so that an imaging unit of the stereo camera is exposed to an outer face of the housing 2 and an optical axis is directed to the driver's seat 106 in the interior 101. The detection unit 31 detects a three-dimensional position (position coordinate) of a head part of the driver sitting on the driver's seat 106 as the state of the monitoring target person OB.

The output unit 32 outputs various pieces of information including a warning to the interior 101 of the vehicle 100. The output unit 32 may include at least one of a speaker that outputs auditory information such as a voice and a warning sound, a display that outputs visual information such as an image and a character, a device that outputs tactile information such as vibration of a steering wheel, vibration of a seat, and reaction force of a pedal, and the like.

The arithmetic unit 33 is a portion that integrally controls the components of the monitoring system 1. The arithmetic unit 33 performs various pieces of arithmetic processing related to state monitoring of the monitoring target person OB, a warning output, and the like. The arithmetic unit 33 includes an electronic circuit that mainly includes a known microcomputer including a central processing unit such as a central processing unit (CPU), a micro processing unit (MPU), an application specific integrated circuit (ASIC), and a field programmable gate array (FPGA), a read only memory (ROM), a random access memory (RAM), and an interface. The detection unit 31 and the output unit 32 are electrically connected to the arithmetic unit 33. The release operation unit 4 and the external connection unit 5 are also electrically connected to the arithmetic unit 33. The arithmetic unit 33 can exchange various electric signals such as a detection signal corresponding to a detection result and a drive signal for driving the components with the components. The arithmetic unit 33 executes a control program stored in a storage unit such as a ROM and a RAM based on various input signals and the like to output an output signal to each component, and execute state monitoring of the monitoring target person OB and various pieces of processing related to a warning output and the like.

Specifically, the arithmetic unit 33 functionally and conceptually includes a determination unit 33a and an operation controller 33b. The determination unit 33a and the operation controller 33b can exchange various pieces of information with various appliances that are electrically connected thereto.

The determination unit 33a is a portion that determines the state of the monitoring target person OB based on a detection result of the state of the monitoring target person OB obtained by the detection unit 31. The determination unit 33a executes various computer programs stored in a storage unit such as a ROM and a RAM, and the computer programs operates to perform various pieces of processing required for determining the state of the monitoring target person OB. The determination unit 33a according to the present embodiment determines the state of the monitoring target person OB based on the three-dimensional position of the head part of the monitoring target person OB (the driver sitting on the driver's seat 106) detected by the detection unit 31.

Figure 3:
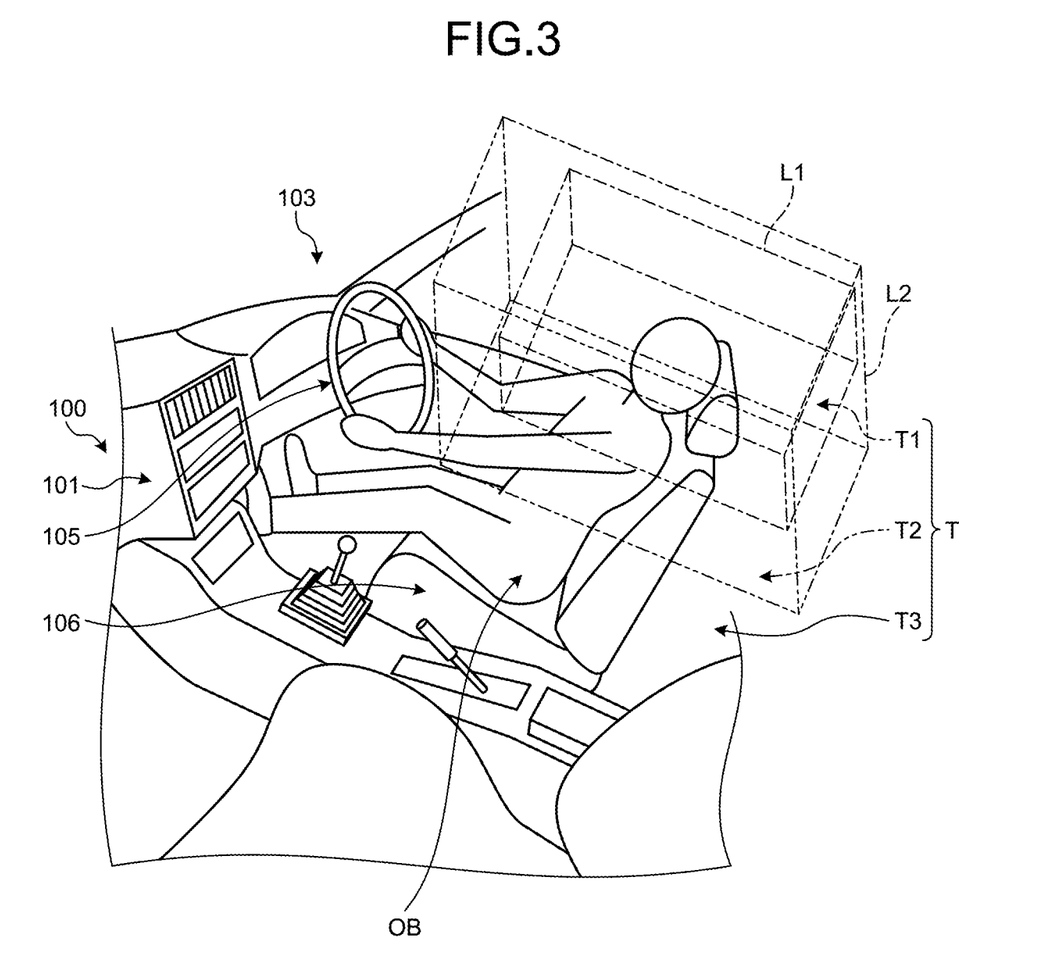
FIG. 3 is a schematic diagram for explaining a state determination region in the interior of the vehicle to which the monitoring system according to the first embodiment is applied.

By way of example, as exemplified in FIG. 3, the determination unit 33a determines the state of the monitoring target person OB based on a position of the monitoring target person OB with respect to a state determination region T three-dimensionally virtualized in the interior 101 of the vehicle 100. The state determination region T is a virtual space region set to the interior 101 of the vehicle 100 in accordance with a seating position and the like of the monitoring target person OB for determining the state of the monitoring target person OB. As the state determination region T according to the present embodiment, three regions in total are set, that is, a normal region T1, an attention attracting region T2, and a warning region T3. The determination unit 33a determines the state of the monitoring target person OB based on the position of the head part of the monitoring target person OB with respect to the three regions in total, that is, the normal region T1, the attention attracting region T2, and the warning region T3. The state determination regions T, that is, the normal region T1, the attention attracting region T2, and the warning region T3 are regions set in advance in accordance with actual vehicle evaluation, for example. For example, the normal region T1, the attention attracting region T2, and the warning region T3 are set in advance while statistically grasping distribution of the position of the head part in a state in which the driver as the monitoring target person OB is sitting on the driver's seat 106 and normally driving the vehicle 100, the distribution to be used as a reference. Typically, the normal region T1 is determined in advance in accordance with a region in which the head part is positioned when the monitoring target person OB is in a normal state. Herein, for example, the normal region T1 is set in advance as a region inside a first boundary line L1 set in a substantially cubic shape based on the driver's seat 106. The first boundary line L1 is set as a boundary line that partitions a region in which the head part of the driver may be positioned at a relatively high rate in a state in which the driver as the monitoring target person OB is sitting on the driver's seat 106 and normally driving the vehicle 100. Typically, the attention attracting region T2 is determined in advance in accordance with a region in which the head part is positioned when the monitoring target person OB is in a state in which attention of the monitoring target person OB is desired to be attracted. Herein, for example, the attention attracting region T2 is set in advance as a region inside a second boundary line L2 set in a substantially cubic shape outside the first boundary line L1 based on the driver's seat 106. The second boundary line L2 is set as a boundary line having a substantially cubic shape that covers the outside of the first boundary line L1. The second boundary line L2 is set as a boundary line that partitions a region in which the head part of the driver is positioned at a relatively high rate in a state in which the driver as the monitoring target person OB is obviously assumed to be in an abnormal state. Typically, the warning region T3 is determined in advance in accordance with a region in which the head part is positioned in a state in which the monitoring target person OB is obviously assumed to be in an abnormal state (for example, in an unconscious state or a fainting state) and a warning should be given to the monitoring target person OB. Herein, for example, the warning region T3 is set in advance as a region outside the second boundary line L2.

The determination unit 33a determines the state of the monitoring target person OB to be distinguished into three states, that is, the normal state, an attention attracting state, and a warning state based on the position of the head part of the monitoring target person OB with respect to the state determination region T set as described above. That is, the determination unit 33a distinguishes and determines the three states, that is, the normal state, the attention attracting state, and the warning state based on the position of the head part of the monitoring target person OB with respect to the three regions, that is, the normal region T1, the attention attracting region T2, and the warning region T3. For example, when determining that the head part of the monitoring target person OB is positioned in the normal region T1 for a certain time or more based on the detection result of the monitoring target person OB obtained by the detection unit 31, the determination unit 33a determines that the monitoring target person OB is in the normal state. When determining that the head part of the monitoring target person OB is positioned in the attention attracting region T2 for a certain time or more based on the detection result of the monitoring target person OB obtained by the detection unit 31, the determination unit 33a determines that the monitoring target person OB is in the attention attracting state. When determining that the head part of the monitoring target person OB is positioned in the warning region T3 for a certain time or more based on the detection result of the monitoring target person OB obtained by the detection unit 31, the determination unit 33a determines that the monitoring target person OB is in the warning state. In a case in which the determination unit 33a determines that the monitoring target person OB is in the attention attracting state, and the attention attracting state continues for a period set in advance, the determination unit 33a may determine that the monitoring target person OB is in the warning state.

In addition to state determination of the monitoring target person OB based on the position of the head part of the monitoring target person OB with respect to the state determination region T as described above, the determination unit 33a may perform state determination of the monitoring target person OB based on movement of the head part of the monitoring target person OB. In this case, based on the detection result of the monitoring target person OB obtained by the detection unit 31, the determination unit 33a may determine that the monitoring target person OB is in the warning state in a case in which the head part of the monitoring target person OB hardly moves, or in a case in which the head part of the monitoring target person OB abnormally moves (for example, moving extremely fast and stopping thereafter).

The operation controller 33b is a portion that controls operations of the components including the output unit 32 based on the determination result of the state of the monitoring target person OB obtained by the determination unit 33a. The operation controller 33b executes various computer programs stored in a storage unit such as a ROM and a RAM, and the computer programs operate to perform various pieces of processing required for implementing the function of the output unit 32. The operation controller 33b according to the present embodiment controls the output unit 32 based on the determination result of the state of the monitoring target person OB based on the state determination region T obtained by the determination unit 33a, and causes the output unit 32 to output various pieces of information including a warning. That is, the operation controller 33b controls the output unit 32 based on the position of the head part of the monitoring target person OB with respect to the state determination region T that is three-dimensionally virtualized in the interior 101 of the vehicle 100, and causes the output unit 32 to output various pieces of information including a warning.

The operation controller 33b according to the present embodiment controls the output unit 32 in accordance with the state of the monitoring target person OB determined by the determination unit 33a, and causes the output unit 32 to attract attention of the monitoring target person OB and give a warning to the monitoring target person OB in a gradually switching manner. For example, when the determination unit 33a determines that the monitoring target person OB is in the normal state, the operation controller 33b does not specifically output information about monitoring from the output unit 32. When the determination unit 33a determines that the monitoring target person OB is in the attention attracting state, the operation controller 33b controls the output unit 32 to output information for attracting attention of the monitoring target person OB as a prior stage of a warning. When the determination unit 33a determines that the monitoring target person OB is in the warning state, the operation controller 33b controls the output unit 32 to output information representing a warning to the monitoring target person OB. As described later, when the operation controller 33b causes the output unit 32 to output a warning and a predetermined support starting condition is satisfied thereafter, the operation controller 33b causes an actuator 108 to deliver various supports via the external connection unit 5 and a vehicle ECU 107. That is, the monitoring system 1 according to the present embodiment attracts attention of the monitoring target person OB, gives a warning to the monitoring target person OB, and supports the monitoring target person OB in a gradually switching manner in accordance with the state of the monitoring target person OB determined by the determination unit 33a.

The release operation unit 4 is arranged being exposed to the outer face of the housing 2 that is arranged on the roof 102, and a warning release operation can be input through the release operation unit 4. The release operation unit 4 is arranged to be exposed to a position where a hand of the monitoring target person OB can reach on the outer face of the housing 2. More preferably, the release operation unit 4 is arranged to be exposed to a position where a hand of the monitoring target person OB can reach in the normal state in which the driver as the monitoring target person OB is sitting on the driver's seat 106 and normally driving the vehicle 100, and the position where the driver cannot touch through a normal driving operation in a state of gripping the steering 105. Additionally, the release operation unit 4 is preferably arranged to be exposed to a position that is easily recognized by the driver as the monitoring target person OB and can be operated without interfering with the normal driving operation, the position being not easily operated by a fellow passenger or a driver in an abnormal state. That is, the release operation unit 4 is preferably arranged to be exposed to a position where a hand of the driver as the monitoring target person OB can reach in the normal state, and the position where the hand of the driver cannot reach unless intentionally stretching his/her hand. For example, the release operation unit 4 is arranged being exposed to a side surface of the housing 2 on the driver's seat 106 side. The release operation unit 4 may be, for example, arranged being exposed to a bottom face of the housing 2 on the driver's seat 106 side, or a plurality of release operation units 4 may be arranged. The release operation unit 4 is, for example, constituted of a push button, or a non-contact type sensor such as an electrostatic capacitance type touch switch and an infrared sensor. When the warning release operation is input, the release operation unit 4 releases the warning output from the output unit 32. For example, when being touched by a hand or a finger of the monitoring target person OB and the like and receiving the warning release operation in a state in which the warning is output by the output unit 32, the release operation unit 4 outputs a release operation input signal to the operation controller 33b of the arithmetic unit 33. When the release operation input signal is input through the release operation unit 4, the operation controller 33b controls the output unit 32 to release the warning. With this configuration, the monitoring device 3 can release the warning when the warning release operation is input to the release operation unit 4 in a state in which the warning is output.

The external connection unit 5 is a portion to which the vehicle electronic controller (ECU) 107 mounted on the vehicle 100 is electrically connected. The external connection unit 5 is constituted of various types of connectors and interface units. The external connection unit 5 electrically connects the operation controller 33b of the arithmetic unit 33 with the vehicle ECU 107 in the monitoring system 1 in a communicable manner via wiring material such as a power supply line for power supply and a communication line for signal communication so that various electric signals can be exchanged therebetween. Herein, the vehicle ECU 107 integrally controls the components of the vehicle 100. The vehicle ECU 107 is electrically connected to the actuator 108 mounted on the vehicle 100 to control the operation of the actuator 108. The actuator 108 is various devices operated by being controlled by the vehicle ECU 107. For example, the actuator 108 may include a traveling system actuator, a multimedia system appliance, and the like. Examples of the traveling system actuator may include a power train for traveling serving as a drive device for causing the vehicle 100 to travel, a steering device for steering the vehicle 100, and a braking device for braking the vehicle 100. Examples of the multimedia system appliance may include a navigation device, an audio device, a meter, an in-vehicle lighting appliance, and various appliances such as a display. When the operation controller 33b causes the output unit 32 to output the warning and the predetermined support starting condition is satisfied thereafter, the operation controller 33b outputs a support request signal to the vehicle ECU 107 via the external connection unit 5. When the support request signal is input through the operation controller 33b, the vehicle ECU 107 controls the operation of the actuator 108 to execute support control for delivering various supports such as automatically decelerating or automatically stopping the vehicle 100, or delivering a report to an emergency contact number.

Figure 4:
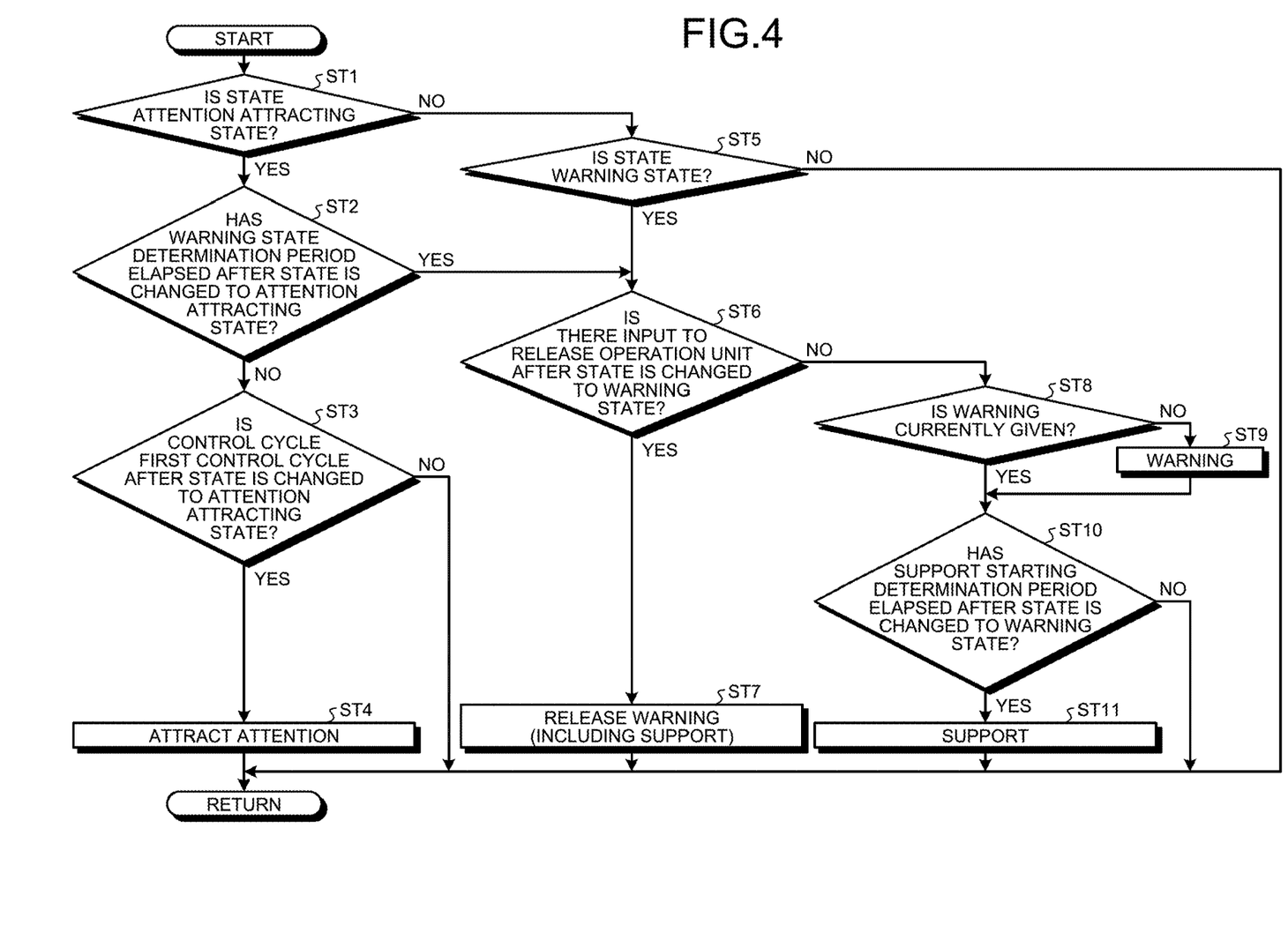
FIG. 4 is a flowchart for explaining monitoring control executed by the monitoring system according to the first embodiment.

Next, the following describes an example of monitoring control executed by the monitoring system 1 with reference to the flowchart in FIG. 4. The monitoring control is implemented when the arithmetic unit 33 performs various pieces of arithmetic processing. Typically, the monitoring control is explained to be executed when the vehicle 100 is traveling, temporarily stopped when the vehicle 100 is stopping, and restarted after the vehicle 100 starts to travel.

However, the present invention is not limited thereto. Each control routine in the monitoring control is, for example, repeatedly performed at a control cycle (clock unit) per several milliseconds (ms) or several tens of milliseconds.

First, the determination unit 33a determines whether the monitoring target person OB is in the attention attracting state based on the detection result of the monitoring target person OB obtained by the detection unit 31 (Step ST1). The determination unit 33a determines whether the head part of the monitoring target person OB is positioned in the attention attracting region T2 for a certain time or more to determine whether the monitoring target person OB is in the attention attracting state. If it is determined that the head part of the monitoring target person OB is positioned in the attention attracting region T2 for a certain time or more, the determination unit 33a determines that the monitoring target person OB is in the attention attracting state. If it is determined that the monitoring target person OB is in the attention attracting state (Yes at Step ST1), the determination unit 33a advances the process to Step ST2. If it is determined that the head part of the monitoring target person OB is not positioned in the attention attracting region T2 for a certain time or more, the determination unit 33a determines that the monitoring target person OB is not in the attention attracting state. If it is determined that the monitoring target person OB is not in the attention attracting state (No at Step ST1), the determination unit 33a advances the process to Step ST5.

If it is determined that the monitoring target person OB is in the attention attracting state at Step ST1 (Yes at Step ST1), the determination unit 33a determines whether a warning state determination period set in advance has elapsed after the state is changed to the attention attracting state (Step ST2). In other words, the determination unit 33a determines whether the attention attracting state has continued for the warning state determination period set in advance.

If it is determined that the warning state determination period has not elapsed after the state is changed to the attention attracting state at Step ST2 (No at Step ST2), the determination unit 33a determines whether the control cycle is the first control cycle after the state is changed to the attention attracting state (Step ST3). If it is determined that the control cycle is not the first control cycle after the state is changed to the attention attracting state (No at Step ST3), the determination unit 33a ends the current control cycle and proceeds to the next control cycle.

If the determination unit 33a determines that the control cycle is the first control cycle after the state is changed to the attention attracting state at Step ST3 (Yes at Step ST3), the operation controller 33b controls the output unit 32 to output information for attracting attention of the monitoring target person OB (Step ST4). Thereafter, the arithmetic unit 33 ends the current control cycle and proceeds to the next control cycle. In this case, for example, the operation controller 33b controls the output unit 32 to output auditory information such as "Concentrate on checking the situation" by voice and the like to output information for attracting attention of the monitoring target person OB. The operation controller 33b may control the output unit 32 to output visual information, tactile information, and the like to output information for attracting attention of the monitoring target person OB. At this point, the determination unit 33a starts to count the elapsed time after the state is changed to the attention attracting state. When the position of the head part of the monitoring target person OB is returned to the normal region T1 and remains in the normal region T1 for a certain time or more, and it is determined that the monitoring target person OB is in the normal state in a subsequent control cycle, the determination unit 33a resets count of the elapsed time. On the other hand, when the position of the head part of the monitoring target person OB remains in the attention attracting region T2 in a subsequent control cycle, the determination unit 33a does not reset the count of the elapsed time, and continues to count the elapsed time.

If it is determined that the warning state determination period has elapsed after the state is changed to the attention attracting state at Step ST2 (Yes at Step ST2), the determination unit 33a determines that the monitoring target person OB is in the warning state. That is, if it is determined that the attention attracting state has continued for the warning state determination period (Yes at Step ST2), the determination unit 33a determines that the monitoring target person OB is in the warning state. The determination unit 33a then advances the process to Step ST6. At this point, the operation controller 33b starts to count the elapsed time after the state is changed to the warning state.

If it is determined that the monitoring target person OB is not in the attention attracting state at Step ST1 (No at Step ST1), the determination unit 33a performs processing at Step ST5. That is, the determination unit 33a determines whether the monitoring target person OB is in the warning state based on the detection result of the monitoring target person OB obtained by the detection unit 31 (Step ST5). The determination unit 33a determines whether the head part of the monitoring target person OB is positioned in the warning region T3 for a certain time or more to determine whether the monitoring target person OB is in the warning state. If it is determined that the head part of the monitoring target person OB is positioned in the warning region T3 for a certain time or more, the determination unit 33a determines that the monitoring target person OB is in the warning state. Also in a case in which it is determined that the monitoring target person OB is in the warning state based on determination at Step ST5 or Step ST2 in a previous control cycle and the warning is not released, the determination unit 33a determines that the monitoring target person OB is in the warning state. Also in a case in which the head part of the monitoring target person OB has moved little or abnormally moved, the determination unit 33a may determine that the monitoring target person OB is in the warning state based on the detection result of the monitoring target person OB obtained by the detection unit 31. If it is determined that the monitoring target person OB is in the warning state (Yes at Step ST5), the determination unit 33a advances the process to Step ST6. At this point, the operation controller 33b starts to count the elapsed time after the state is changed to the warning state. In a case in which it is determined that the head part of the monitoring target person OB is not positioned in the warning region T3 for a certain time or more, and the monitoring target person OB is not in the warning state based on the determination at Step ST5 or Step ST2 in the previous control cycle, the determination unit 33a determines that the monitoring target person OB is not in the warning state. If it is determined that the monitoring target person OB is not in the warning state (No at Step ST5), the determination unit 33a determines that the monitoring target person OB is in the normal state, ends the current control cycle, and proceeds to the next control cycle.

At Step ST6, the operation controller 33b determines whether the warning release operation is input to the release operation unit 4 after the state is changed to the warning state (Step ST6). The operation controller 33b determines whether the warning release operation is input to the release operation unit 4 based on whether the release operation input signal is input from the release operation unit 4. If it is determined that the release operation input signal is input from the release operation unit 4, the operation controller 33b determines that the warning release operation is input to the release operation unit 4. If it is determined that the warning release operation is input to the release operation unit 4 (Yes at Step ST6), the operation controller 33b advances the process to Step ST7. If it is determined that the release operation input signal is not input from the release operation unit 4, the operation controller 33b determines that the warning release operation is not input to the release operation unit 4. If it is determined that the warning release operation is not input to the release operation unit 4 (No at Step ST6), the operation controller 33b advances the process to Step ST8.

If it is determined that the warning release operation is input to the release operation unit 4 (Yes at Step ST6), the operation controller 33b controls the output unit 32 to release the warning and the warning state made through processing at Step ST9 described later in the previous control cycle, and returns to the normal state (Step ST7). At this point, the operation controller 33b may output a support release signal to the vehicle ECU 107 via the external connection unit 5 to release support delivered at Step ST11 described later in the previous control cycle. The arithmetic unit 33 then ends the current control cycle, and proceeds to the next control cycle.

If it is determined that the warning release operation is not input to the release operation unit 4 at Step ST6 (No at Step ST6), the operation controller 33b determines whether the warning is currently given (Step ST8). If it is determined that the warning is currently given (Yes at Step ST8), the operation controller 33b advances the process to Step ST10.

If it is determined that the warning is not currently given at Step ST8 (No at Step ST8), the operation controller 33b controls the output unit 32 to output information representing the warning to the monitoring target person OB (Step ST9), and advances the process to Step ST10. In this case, for example, the operation controller 33b controls the output unit 32 to output auditory information such as "Abnormality of the driver is detected. If you are not in an abnormal state, touch the release switch" by voice and the like to output information representing the warning to the monitoring target person OB. The operation controller 33b may control the output unit 32 to output visual information, tactile information, and the like to output information representing the warning to the monitoring target person OB.

At Step ST10, the operation controller 33b determines whether a support starting determination period set in advance has elapsed after the state is changed to the warning state, that is, determines whether the warning has continued for the support starting determination period set in advance (Step ST10). If it is determined that the support starting determination period has not elapsed after the state is changed to the warning state (No at Step ST10), the operation controller 33b ends the current control cycle, and proceeds to the next control cycle. That is, if it is determined that the warning has not continued for the support starting determination period (No at Step ST10), the operation controller 33b ends the current control cycle, and proceeds to the next control cycle. The operation controller 33b resets the count of the elapsed time when the warning is released in a subsequent control cycle. On the other hand, when the warning state of the monitoring target person OB continues in the subsequent control cycle, the operation controller 33b does not reset the count of the elapsed time, and continues to count the elapsed time.

If it is determined that the support starting determination period has elapsed after the state is changed to the warning state at Step ST10 (Yes at Step ST10), the operation controller 33b advances the process to Step ST11. That is, if it is determined that the warning has continued for the support starting determination period (Yes at Step ST10), the operation controller 33b advances the process to Step ST11. In this case, the operation controller 33b outputs the support request signal to the vehicle ECU 107 via the external connection unit 5, and causes the vehicle ECU 107 to control the operation of the actuator 108 to execute support control for delivering various supports (Step ST11). The arithmetic unit 33 then ends the current control cycle, and proceeds to the next control cycle.

In the monitoring system 1 described above, even when the monitoring device 3 outputs the warning although the monitoring target person OB is not in the abnormal state, the warning can be released when the warning release operation is input to the release operation unit 4 by the monitoring target person OB. With this configuration, the monitoring system 1 can grasp the state of the monitoring target person OB more accurately. In the monitoring system 1, the release operation unit 4 is arranged being exposed to the outer face of the housing 2 arranged on a surface of the roof 102 on the interior 101 side, at a position where the hand of the monitoring target person OB can reach in the normal state, and where the hand cannot reach unless intentionally stretching the hand. With this configuration, the monitoring system 1 can prevent the release operation unit 4 from being erroneously operated, and can release the warning after clearly checking consciousness of the monitoring target person OB. That is, the release operation unit 4 is arranged being exposed to a position that can be operated without interfering with the driving operation of the driver as the monitoring target person OB and that cannot be easily operated by a fellow passenger or a driver in an abnormal state, so that the monitoring system 1 can prevent the release operation unit 4 from being unintentionally operated and prevent the warning from being unintentionally released. As a result, the monitoring system 1 prevents the warning from being erroneously released, and can grasp the state of the monitoring target person OB more accurately. The release operation unit 4 is arranged being exposed to the outer face of the housing 2 arranged on the roof 102, so that the monitoring system 1 can suppress a viewpoint movement amount from a viewpoint position in the normal driving state to the release operation unit 4, and the release operation unit 4 can be caused to be easily recognized. In view of such a situation, the monitoring system 1 can grasp the state of the monitoring target person OB more accurately. Thus, the monitoring system 1 can appropriately monitor the monitoring target person OB in the interior 101 of the vehicle 100. The release operation unit 4 is arranged being exposed to the outer face of the housing 2 arranged on the roof 102, so that the monitoring system 1 can cause a saver and the like to easily visually recognize the release operation unit 4, for example.

In the monitoring system 1 described above, the components including the monitoring device 3 and the release operation unit 4 are arranged in the housing 2, so that the entire monitoring system 1 can be unitized as the over-head module. With this configuration, mountability of the monitoring system 1 with respect to the vehicle 100 can be improved.

Additionally, in the monitoring system 1 described above, the monitoring device 3 outputs a warning based on the position of the monitoring target person OB with respect to the state determination region T virtualized in the interior 101. With this configuration, the monitoring system 1 can prevent the warning from being erroneously released as described above, and can grasp the state of the monitoring target person OB more accurately, so that the monitoring system 1 can appropriately monitor the monitoring target person OB in the interior 101 of the vehicle 100.

Second Embodiment

The monitoring system according to a second embodiment is different from that in the first embodiment in that the monitoring system according to the second embodiment includes an illumination unit. In the following description, the same component as that in the embodiment described above is denoted by the same reference numeral, and redundant description about the same configuration, operation, and effect is omitted as much as possible.

Figure 5:
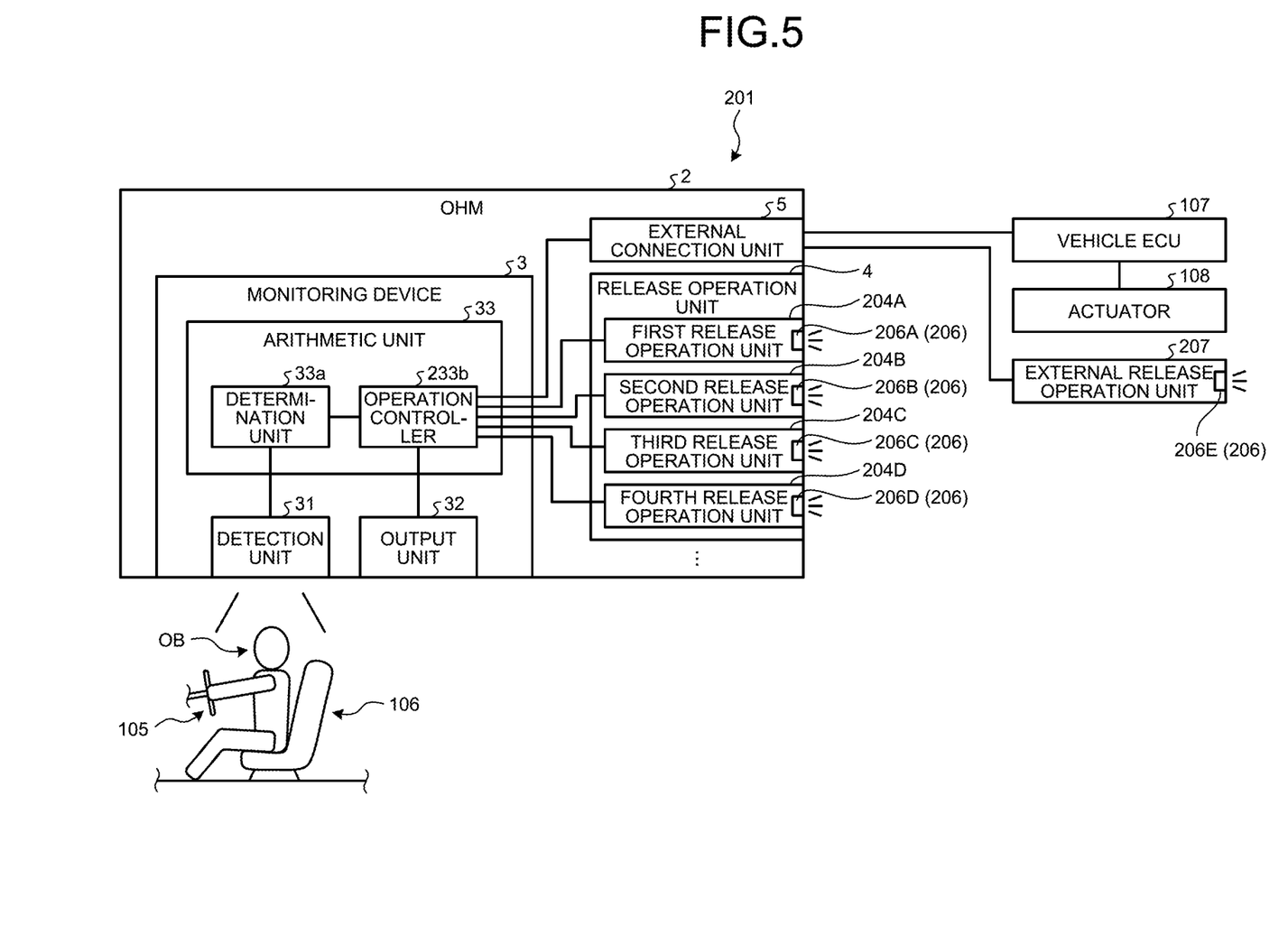
FIG. 5 is a block diagram illustrating a schematic configuration of a monitoring system according to a second embodiment.

As illustrated in FIG. 5, a monitoring system 201 according to the present embodiment is different from the monitoring system 1 described above in that the monitoring system 201 includes a plurality of release operation units 4 arranged therein, an illumination unit 206, and an operation controller 233*b* in place of the operation controller 33*b*. The other configuration of the monitoring system 201 is substantially the same as that of the monitoring system 1.

Figure 6:
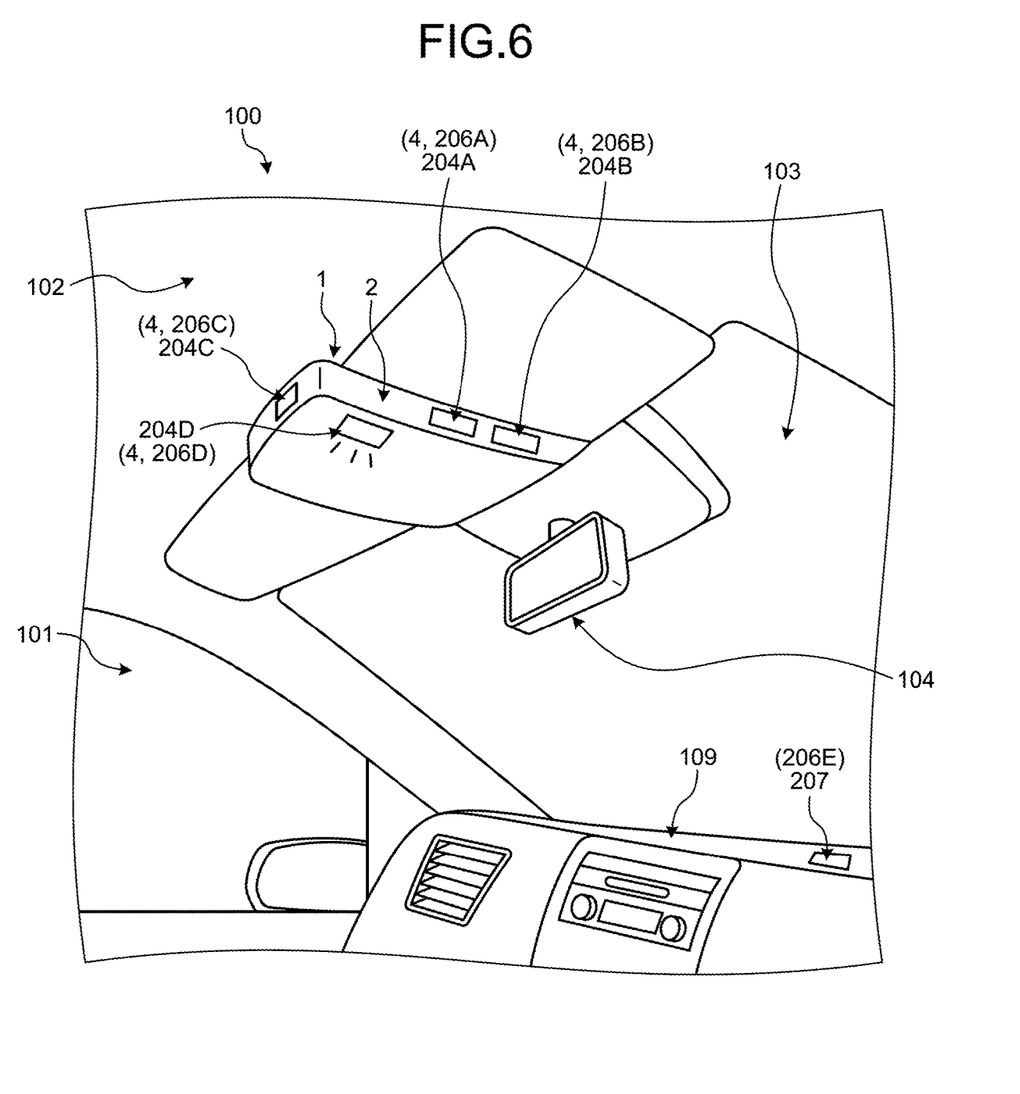
FIG. 6 is a partial schematic diagram illustrating a schematic configuration of an interior of a vehicle to which the monitoring system according to the second embodiment is applied.

A plurality of release operation units 4 are arranged in the present embodiment. Herein, for example, four release operation units 4 in total are arranged, that is, a first release operation unit 204A, a second release operation unit 204B, a third release operation unit 204C, and a fourth release operation unit 204D. As illustrated in FIG. 6, the first release operation unit 204A and the second release operation unit 204B are arranged side by side being exposed to a side surface of the housing 2 on the driver's seat 106 side. The third release operation unit 204C is arranged being exposed to a side surface of the housing 2 on a vehicle rear side. The fourth release operation unit 204D is arranged being exposed to an end of a bottom face of the housing 2 on the driver's seat 106 side. In the following description, in a case in which the first release operation unit 204A, the second release operation unit 204B, the third release operation unit 204C, and the fourth release operation unit 204D are not required to be distinguished from each other, they may be simply referred to as the release operation unit 4.

The illumination unit 206 constitutes illumination for illuminating the release operation unit 4. The illumination unit 206 includes, for example, a light source such as a light emitting diode (LED) element that emits light of various colors such as white light, red light, blue light, and green light. The illumination unit 206 may illuminate the release operation unit 4 by causing a push button, an operation region, and the like constituting the release operation unit 4 to emit light from the inside (inside of the housing 2), or may illuminate the release operation unit 4 by illuminating the outside thereof (outside of the housing 2). One illumination unit 206 is arranged for each of the release operation units 4. That is, a plurality of pairs of the release operation unit 4 and the illumination unit 206 for illuminating the release operation unit 4 are arranged. Herein, the illumination unit 206 includes a first illumination unit 206A that illuminates the first release operation unit 204A, a second illumination unit 206B that illuminates the second release operation unit 204B, a third illumination unit 206C that illuminates the third release operation unit 204C, and a fourth illumination unit 206D that illuminates the fourth release operation unit 204D. In the following description, in a case in which the first illumination unit 206A, the second illumination unit 206B, the third illumination unit 206C, and the fourth illumination unit 206D are not required to be distinguished from each other, they may be simply referred to as the illumination unit 206.

Similarly to the operation controller 33*b* described above, the operation controller 233*b* is a portion that controls the operations of the components including the output unit 32 based on the determination result of the state of the monitoring target person OB obtained by the determination unit 33*a*. Additionally, the operation controller 233*b* according to the present embodiment is different from the operation controller 33*b* in that the operation controller 233*b* also functions as a controller for an operation unit/illumination unit for controlling the operation of the release operation unit 4 and the illumination unit 206.

The operation controller 233*b* according to the present embodiment validates an operation of any one of a plurality of pairs of the release operation unit 4 and the illumination unit 206 and invalidates the operations of the other pairs when the warning is output by the monitoring device 3. That is, a plurality of pairs of the release operation unit 4 and the illumination unit 206 are arranged, and the operation of any one of the pairs is validated and the operations of the other pairs are invalidated when the warning is output by the monitoring device 3. The operation controller 233*b* controls and turns ON the illumination unit 206 the operation of which is validated, and keeps the illumination unit 206 the operation of which is invalidated in an OFF state. Accordingly, the illumination unit 206 the operation of which is validated illuminates the corresponding release operation unit 4, and the illumination unit 206 the operation of which is invalidated does not illuminate the release operation unit 4. When the warning release operation is input to the release operation unit 4 the operation of which is validated in a state in which the warning is output, the operation controller 233*b* releases the warning. That is, when the warning release operation is input to the release operation unit 4 the operation of which is validated, and the release operation input signal is input through the release operation unit 4, the operation controller 233*b* controls the output unit 32 to release the warning. At this point, the operation controller 233*b* also ends illumination for the release operation unit 4 by the illumination unit 206. On the other hand, when the warning release operation is input to the release operation unit 4 the operation of which is invalidated in a state in which the warning is output, the operation controller 233*b* does not release the warning. That is, even when the warning release operation is input to the release operation unit 4 the operation of which is invalidated and the release operation input signal is input through the release operation unit 4, the operation controller 233*b* does not control the output unit 32 and does not release the warning. Alternatively, even when the warning release operation is input to the release operation unit 4 the operation of which is invalidated, the operation controller 233*b* may control the release operation unit 4 not to output the release operation input signal itself.

The operation controller 233*b* according to the present embodiment may control, for example, the illumination unit 206 based on the detection result of the state of the monitoring target person OB obtained by the detection unit 31. For example, the operation controller 233*b* may control the illumination unit 206 to cause an illumination mode for the release operation unit 4 of the illumination unit 206 as a target to be variable based on the determination result of the state of the monitoring target person OB obtained by the determination unit 33a based on the detection result. That is, the illumination mode of the illumination unit 206 for the release operation unit 4 may be caused to be variable based on the detection result and the determination result of the state of the monitoring target person OB obtained by the monitoring device 3. As the illumination mode, for example, the operation controller 233b can cause light emission color, brightness, and a cycle, a pattern, and the number of times of ON/OFF of the illumination unit 206 to be variable. For example, the operation controller 233b may cause the illumination mode for the release operation unit 4 of the illumination unit 206 to be variable in accordance with a degree of urgency at the time when the monitoring target person OB is in the warning state. Herein, the degree of urgency in the warning state is set in accordance with frequency with which the monitoring target person OB is determined to be in the warning state, or a length of a period in which the monitoring target person OB is in the warning state, for example. In this case, when the frequency with which the monitoring target person OB is determined to be in the warning state is relatively low, or when a period determined to be the warning state is relatively short, the operation controller 233b determines that the degree of urgency in the warning state is relatively low. When the degree of urgency is relatively low at the time when the monitoring target person OB is in the warning state, for example, the operation controller 233b causes the cycle of ON/OFF of the illumination unit 206 to be relatively long, and causes the illumination unit 206 to slowly blink in the same pattern. In this case, the operation controller 233b may cause the light emission color of the illumination unit 206, for example, to be blue. On the other hand, when degree of urgency is relatively high when the monitoring target person OB is in the warning state, the operation controller 233b causes the cycle of ON/OFF of the illumination unit 206 to be relatively short, for example, and causes the illumination unit 206 to quickly blink in various patterns. In this case, the operation controller 233b may also cause the light emission color of the illumination unit 206 to be red and the like.

Figure 7:
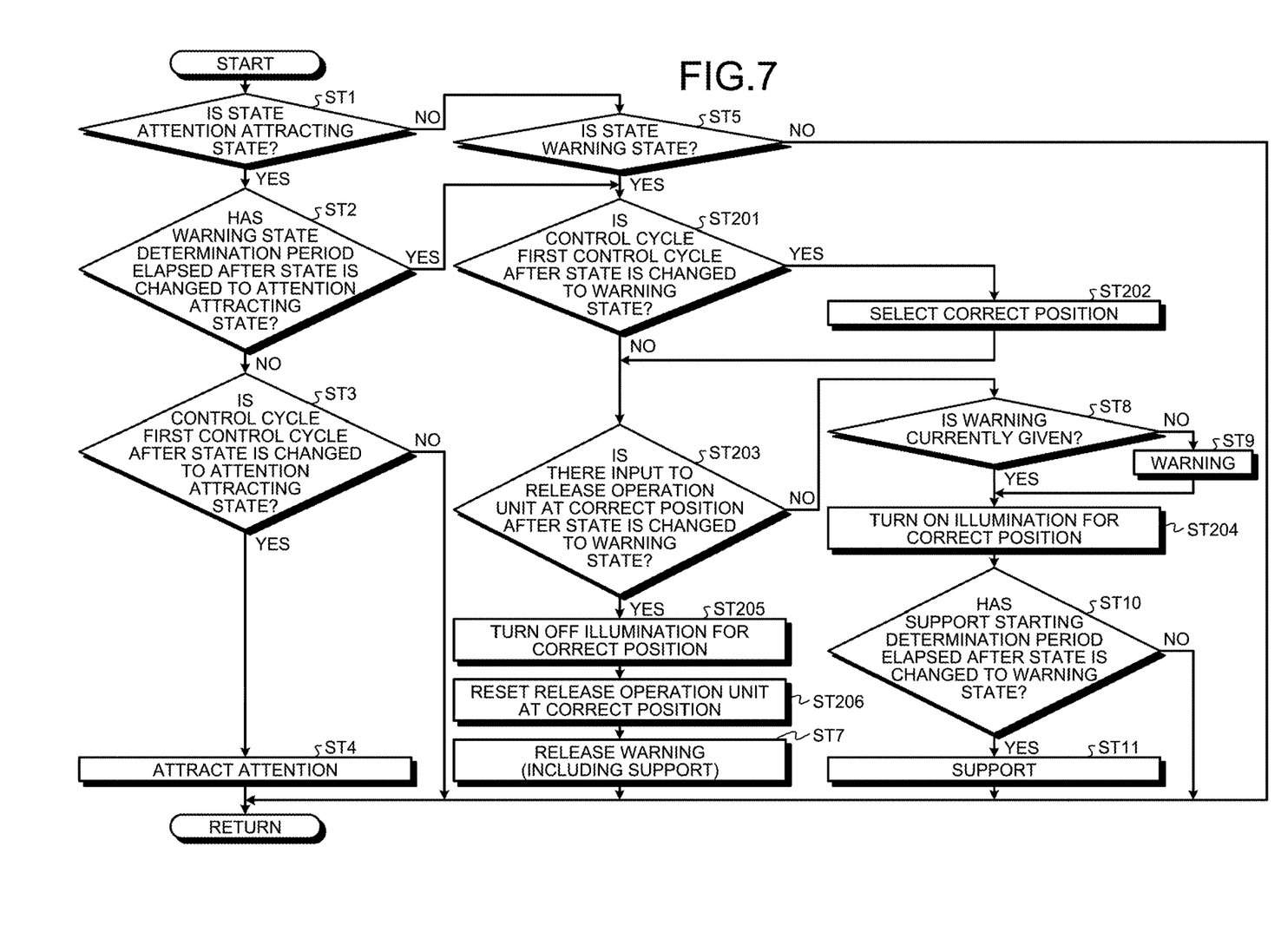
FIG. 7 is a flowchart for explaining monitoring control executed by the monitoring system according to the second embodiment.

Next, the following describes an example of monitoring control executed by the monitoring system 201 with reference to the flowchart in FIG. 7. Herein, redundant description about the monitoring control executed by the monitoring system 1 described above is omitted as much as possible.

If it is determined that the warning state determination period has elapsed after the state is changed to the attention attracting state at Step ST2 (Yes at Step ST2), the determination unit 33a determines that the monitoring target person OB is in the warning state, and advances the process to Step ST201. At this point, the operation controller 233b starts to count the elapsed time after the state is changed to the warning state. If it is determined that the monitoring target person OB is in the warning state at Step ST5 (Yes at Step ST5), the determination unit 33a advances the process to Step ST201. At this point, the operation controller 233b starts to count the elapsed time after the state is changed to the warning state.

At Step ST201, the determination unit 33a determines whether the control cycle is the first control cycle after the state is changed to the warning state (Step ST201). If the determination unit 33a determines that the control cycle is the first control cycle after the state is changed to the warning state (Yes at Step ST201), the operation controller 233b selects any one of a plurality of pairs of the release operation unit 4 and the illumination unit 206 as a correct position (Step ST202). In this case, for example, the operation controller 233b randomly selects, as the correct position, one of a plurality of pairs of the release operation unit 4 and the illumination unit 206 using various known methods. The operation controller 233b then advances the process to Step ST203. On the other hand, if the determination unit 33a determines that the control cycle is not the first control cycle after the state is changed to the warning state at Step ST201 (No at Step ST201), the operation controller 233b advances the process to Step ST203.

At Step ST203, the operation controller 233b validates the operation of the release operation unit 4 at the correct position selected at Step ST202, and determines whether the warning release operation has been input to the release operation unit 4 at the correct position after the state is changed to the warning state (Step ST203). In this case, the operation controller 233b invalidates the operation of the other release operation units 4. The operation controller 233b determines whether the warning release operation has been input to the release operation unit 4 at the correct position based on whether the release operation input signal is input through the release operation unit 4 at the correct position. If it is determined that the release operation input signal is not input through the release operation unit 4 at the correct position, the operation controller 233b determines that the warning release operation is not input to the release operation unit 4 at the correct position. If it is determined that the warning release operation is not input to the release operation unit 4 at the correct position (No at Step ST203), the operation controller 233b advances the process to Step ST8.

If it is determined that the warning is currently given at Step ST8 (Yes at Step ST8), the operation controller 233b advances the process to Step ST204. On the other hand, if it is determined that the warning is not currently given at Step ST8 (No at Step ST8), the operation controller 233b controls the output unit 32 to output information representing the warning to the monitoring target person OB (Step ST9), and advances the process to Step ST204.

At Step ST204, the operation controller 233b controls the illumination unit 206 corresponding to the release operation unit 4 at the correct position selected at Step ST202 to validate the operation (illumination ON), and illuminates the release operation unit 4 at the correct position with the illumination unit 206 (Step ST204). In this case, the operation controller 233b invalidates the operations of the other illumination units 206. In this case, if the release operation unit 4 at the correct position has already been illuminated with the illumination unit 206, the operation controller 233b continues to illuminate the release operation unit 4 at the correct position. Also in this case, the operation controller 233b determines the degree of urgency in accordance with frequency with which the state is determined to be the warning state, a length of a period in which the state is determined to be the warning state, and the like, and may cause the illumination mode of the illumination unit 206 for the release operation unit 4 at the correct position to be variable in accordance with the degree of urgency at the time when the state is the warning state. Thereafter, the operation controller 233b advances the process to Step ST10.

If it is determined that the release operation input signal is input through the release operation unit 4 at the correct position at Step ST203, the operation controller 233b determines that the warning release operation is input to the release operation unit 4 at the correct position. If it is determined that the warning release operation is input to the release operation unit 4 at the correct position (Yes at Step ST203), the operation controller 233b advances the process to Step ST205.

At Step ST205, the operation controller 233b controls the illumination unit 206 corresponding to the release operation unit 4 at the correct position to invalidate the operation (illumination OFF), turns OFF the illumination unit 206 to end illumination for the release operation unit 4 at the correct position by the illumination unit 206 (Step ST205). Thereafter, the operation controller 233b advances the process to Step ST206.

At Step ST206, the operation controller 233b resets the release operation unit 4 at the correct position selected at Step ST202 (Step ST206), and advances the process to Step ST7.

The monitoring system 201 described above can grasp the state of the monitoring target person OB more accurately, so that the monitoring target person OB in the interior 101 of the vehicle 100 can be appropriately monitored.

The monitoring system 201 described above includes the illumination unit 206 for illuminating the release operation unit 4. Herein, in the monitoring system 201, the release operation unit 4 for inputting the warning release operation by the monitoring target person OB tends to be positioned in a region included in what is called peripheral vision of the monitoring target person OB sitting on the driver's seat 106. As compared with what is called a central visual field and an effective visual field, an object tends to be seen only vaguely in the peripheral vision, and the object tends to be hardly perceived clearly. In contrast, contrast tends to be easily perceived in the peripheral vision due to what is called a rod cell, so that the peripheral vision tends to quickly react to a minute change in contrast of light or movement of an object with high sensitivity as compared with the central visual field and the effective visual field. Thus, by illuminating the release operation unit 4 with the illumination unit 206, the monitoring system 201 can cause the monitoring target person OB to intuitively and easily understand the position of the release operation unit 4 that tends to be positioned in the peripheral vision of the monitoring target person OB. With this configuration, the monitoring system 201 can visually appeal that the monitoring target person OB is in the warning state. As a result, the monitoring system 201 can grasp the state of the monitoring target person OB more accurately, so that the monitoring target person OB in the interior 101 of the vehicle 100 can be monitored more appropriately.

Herein, in the monitoring system 201 described above, a plurality of pairs of the release operation unit 4 and the illumination unit 206 are arranged, and the operation of any one of the pairs is validated and the operations of the other pairs are invalidated at the time when the warning is output by the monitoring device 3. With this configuration, in the monitoring system 201, the warning is released when the warning release operation is input to the release operation unit 4 the operation of which is validated by being illuminated with the illumination unit 206 among a plurality of pairs of the release operation unit 4 and the illumination unit 206. On the other hand, the monitoring system 201 can prevent the warning from being released even when the warning release operation is input to the other release operation units 4. As a result, the monitoring system 201 can prevent the warning release operation from being reflectively/unconsciously input to the release operation unit 4, and prevent the warning from being erroneously released. Accordingly, the monitoring system 201 can release the warning after clearly checking consciousness of the monitoring target person OB. In view of such a situation, the monitoring system 201 can grasp the state of the monitoring target person OB more accurately, so that the monitoring target person OB in the interior 101 of the vehicle 100 can be monitored more appropriately. With this configuration, the monitoring system 201 can cause the monitoring target person OB to awaken.

Additionally, in the monitoring system 201 described above, the illumination mode of the illumination unit 206 for the release operation unit 4 is caused to be variable based on the detection result and the determination result of the state of the monitoring target person OB obtained by the monitoring device 3. As a result, the monitoring system 201 can sensuously and easily report the state of the monitoring target person OB due to the illumination mode of the illumination unit 206 for the release operation unit 4. For example, the monitoring system 201 can report the degree of urgency in the warning state to be easily understand.

The monitoring system 201 described above may also include an external release operation unit 207 as illustrated in FIGS. 5 and 6. Similarly to the release operation unit 4, the warning release operation can be input to the external release operation unit 207. However, the external release operation unit 207 is different from the release operation unit 4 in that the external release operation unit 207 is arranged at a position other than the housing 2. Herein, the external release operation unit 207 is arranged to be exposed to a position where the hand of the driver as the monitoring target person OB can reach on an outer face of an instrument panel 109 arranged in the interior 101 of the vehicle 100. Similarly to the release operation unit 4, for example, the external release operation unit 207 is constituted of a push button, or a non-contact type sensor such as an electrostatic capacitance type touch switch and an infrared sensor. The external release operation unit 207 is electrically connected to the external connection unit 5. Herein, the external connection unit 5 electrically connects the operation controller 233b of the arithmetic unit 33 in the monitoring system 201 with the external release operation unit 207 in a communicable manner via wiring material such as a power supply line for power supply and a communication line for signal communication so that various electric signals can be exchanged therebetween. The external release operation unit 207 causes the warning from the output unit 32 to be released when the warning release operation is input. For example, when the external release operation unit 207 is touched by a hand or a finger of the monitoring target person OB and the like and receives warning release operation in a state in which the warning is output by the output unit 32, the external release operation unit 207 outputs the release operation input signal to the operation controller 233b of the arithmetic unit 33. When receiving the release operation input signal input from the external release operation unit 207, the operation controller 233b controls the output unit 32 to release the warning. With this configuration, the monitoring device 3 can release the warning when the warning release operation is input to the external release operation unit 207 in a state in which the warning is output.

In this case, the illumination unit 206 includes an external illumination unit 206E that illuminates the external release operation unit 207. The operation controller 233b also functions as a controller for an operation unit/illumination unit that controls operations of the external release operation unit 207 and the external illumination unit 206E. The operation controller 233b controls the operation to be valid/invalid including a pair of the external release operation unit 207 and the external illumination unit 206E as a target the operation of which is controlled to be valid/invalid. That is, at the time when the warning is output by the monitoring device 3, the operation controller 233b validates the operation of any one of a plurality of pairs (four pairs in the above example) of the release operation unit 4 and the illumination unit 206 and a pair of the external release operation unit 207 and the illumination unit 206, and invalidates the operations of the other pairs. Also in this case, the monitoring system 201 can grasp the state of the monitoring target person OB more accurately, so that the monitoring target person OB in the interior 101 of the vehicle 100 can be monitored more appropriately.

The monitoring system according to the embodiments of the present invention described above is not limited to the embodiments, and variously modified within a range described in claims.

In the above description, by way of example, the monitoring device 3 monitors the state of the driver sitting on the driver's seat 106 as the monitoring target person OB in the interior 101 of the vehicle 100. However, the embodiment is not limited thereto.

In the monitoring device 3 described above, content of monitoring may be changed in accordance with the number of times when the release operation unit 4 is operated and the warning is released. For example, the monitoring device 3 may cause the warning state determination period and the support starting determination period to be relatively shortened as the number of times when the release operation unit 4 is operated and the warning is released increases.

In the above description, each of the monitoring systems 1 and 201 is arranged on a surface on the interior 101 side of the roof 102 of the vehicle 100 as a whole to constitute the over-head module, but the embodiment is not limited thereto. In the monitoring systems 1 and 201, at least the release operation unit 4 may be arranged being exposed to the outer face of the housing 2 arranged on the roof 102. In the monitoring systems 1 and 201, for example, the monitoring device 3 may be arranged outside the housing 2 to be electrically connected to the release operation unit 4 and the like via wiring material. For example, the vehicle ECU 107 that integrally controls the components of the vehicle 100 may also function as the arithmetic unit 33. A display, a speaker, and the like of a navigation system mounted on the vehicle 100 may also function as the output unit 32.

In the above description, the detection unit 31 is constituted of a detector such as a stereo camera that is housed in the housing 2 arranged on the roof 102 and can measure a three-dimensional position of the monitoring target person OB sitting on the driver's seat 106, but the embodiment is not limited thereto. In the above description, the monitoring device 3 monitors the state of the monitoring target person OB to output the warning based on the position of the monitoring target person OB with respect to the state determination region T, but the embodiment is not limited thereto. The monitoring device 3 may have another configuration so long as the warning is output when abnormality of the monitoring target person OB is detected. For example, the detection unit 31 may detect biological information of the monitoring target person OB as the state of the monitoring target person OB (vital signs such as a heart rate, a respiration rate, a pulse rate, a blood pressure, body temperature, brain waves, and a muscle current, blood sugar level information, blood alcohol concentration, electrocardiographic information, consciousness degree information, face orientation/line of sight information, eyelid opening/closing degree information, and the like), and vehicle operation information of the monitoring target person OB (accelerator pedal stroke information, brake pedal stroke information, steering rudder angle information, yaw rate information, and the like). In this case, for example, the detection unit 31 may include various radar/sonar using infrared rays, a millimeter wave, an ultrasonic wave, and the like, an electrode that detects various pieces of biological information, an appliance such as a blood pressure sensor, an electrocardiographic sensor, a heartbeat sensor, a respiration sensor, a pulse sensor, a blood pressure sensor, a body temperature sensor, a brain wave sensor, and a muscle current sensor, and a sensor that is arranged in the components of the vehicle 100 to detect various pieces of vehicle operation information. In this case, the detection unit 31 may be arranged in a seat such as the driver's seat 106, the steering 105, a steering column supporting the steering 105, a meter, an instrument panel, a pillar, a room mirror, various wearable appliances, and the like. The monitoring device 3 may monitor the state of the monitoring target person OB to output the warning based on various pieces of information representing the state of the monitoring target person OB detected by the above appliances.

The illumination unit 206 described above may be arranged for the release operation unit 4 in the monitoring system 1 described in the first embodiment.

With the monitoring system according to the embodiments, even when the warning is output by the monitoring device although the monitoring target person is not in an abnormal state, the warning can be released when the monitoring target person inputs the warning release operation to the release operation unit. As a result, the monitoring system can grasp the state of the monitoring target person more accurately, so that the monitoring target person in the interior of the vehicle can be appropriately monitored.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring system comprising:
    a monitoring device that outputs a warning when detecting abnormality of a monitoring target person in an interior of a vehicle;
    a housing arranged on a surface on an interior side of a roof of the vehicle; and
    a dismiss operation unit arranged to be exposed from an outer face of the housing, the dismiss operation unit being able to receive an input of a warning dismiss operation that makes the monitoring device dismiss the warning,
    wherein in the monitoring device, as a state determination region three-dimensionally virtualized in the interior of the vehicle, a normal region, an attention attracting region set around the normal region, and a warning region set around the attention attracting region are set,
    wherein the monitoring device determines a state of the monitoring target person to be distinguished into three states, that is, a normal state, an attention attracting state, and a warning state based on a position of a head part of the monitoring target person with respect to the normal region, the attention attracting region, and the warning region in the state determination region,
    wherein when the monitoring device determines that the monitoring target person is in the attention attracting state, the monitoring device outputs an information for attracting attention of the monitoring target person as a prior stage of the warning, wherein when the monitoring device determines that the monitoring target person is in the warning state, the monitoring device outputs the warning, wherein the monitoring device, in a state of outputting the warning, dismisses the warning by the warning dismiss operation being inputted to the dismiss operation unit, and wherein the monitoring device is further configured to determine, in response to detecting the abnormality, whether the warning dismiss operation is input to the dismiss operating unit before the warning is output.

2. The monitoring system according to claim 1, wherein the monitoring device is arranged in the housing.

3. The monitoring system according to claim 2, further comprising:

an illumination unit that illuminates the dismiss operation unit.

4. The monitoring system according to claim 3, wherein a plurality of pairs of the dismiss operation unit and the illumination unit that illuminates the dismiss operation unit are arranged, an operation of any one of the pairs is validated and operations of the other pairs are invalidated when the warning is output by the monitoring device, the illumination unit the operation of which is validated illuminates the dismiss operation unit, the illumination unit the operation of which is invalidated does not illuminate the dismiss operation unit, and the monitoring device, in a state of outputting the warning, dismisses the warning when the warning dismiss operation is input to the dismiss operation unit the operation of which is validated, and does not dismiss the warning when the warning dismiss operation is input to the dismiss operation unit the operation of which is invalidated.

5. The monitoring system according to claim 1, further comprising:

an illumination unit that illuminates the dismiss operation unit.

6. The monitoring system according to claim 5, wherein a plurality of pairs of the dismiss operation unit and the illumination unit that illuminates the dismiss operation unit are arranged, an operation of any one of the pairs is validated and operations of the other pairs are invalidated when the warning is output by the monitoring device, the illumination unit the operation of which is validated illuminates the dismiss operation unit, the illumination unit the operation of which is invalidated does not illuminate the dismiss operation unit, and the monitoring device, in a state of outputting the warning, dismisses the warning when the warning dismiss operation is input to the dismiss operation unit the operation of which is validated, and does not dismiss the warning when the warning dismiss operation is input to the dismiss operation unit the operation of which is invalidated.

7. The monitoring system according to claim 5, wherein the illumination unit causes an illumination mode for the dismiss operation unit to be variable based on a detection result of the state of the monitoring target person obtained by the monitoring device.

8. The monitoring system according to claim 6, wherein the illumination unit causes an illumination mode for the dismiss operation unit to be variable based on a detection result of the state of the monitoring target person obtained by the monitoring device.

9. The monitoring system according to claim 1, wherein the monitoring device is configured to detect the abnormality of the monitoring target person, wherein the monitoring device is further configured to determine whether the warning dismiss operation is input to the dismiss operating unit both before the warning is output and after the monitoring device detects the abnormality of the monitoring target person, and wherein, in a case that the monitoring device determines that the warning dismiss operation is input to the dismiss operating unit both before the warning is output and after the monitoring device detects the abnormality of the monitoring target person, the monitoring device omits outputting the warning when detecting the abnormality of the monitoring target person.

10. The monitoring device according to claim 1, wherein the monitoring device is further configured to determine, in response to determining that the warning dismiss operation is not input to the dismiss operating unit before the warning is output, whether the warning is currently output, and wherein each of the normal region, the attention attracting region, and the warning region are cubic.

* * * * *